METHOD AND APPARATUS FOR MAKING AND SCANNING SPOT PATTERNS

Filed June 9, 1965 4 Sheets-Sheet 1

Daniel Silverman INVENTOR.

May 30, 1967 D. SILVERMAN 3,322,033

METHOD AND APPARATUS FOR MAKING AND SCANNING SPOT PATTERNS

Filed June 9, 1965 4 Sheets-Sheet 2

Daniel Silverman

INVENTOR.

Daniel Silverman
INVENTOR.

METHOD AND APPARATUS FOR MAKING AND SCANNING SPOT PATTERNS

Filed June 9, 1965

4 Sheets-Sheet 4

Daniel Silverman

INVENTOR.

United States Patent Office 3,322,033

Patented May 30, 1967

3,322,033

METHOD AND APPARATUS FOR MAKING AND SCANNING SPOT PATTERNS

Daniel Silverman, 5969 S. Birmingham, Tulsa, Okla. 74105

Filed June 9, 1965, Ser. No. 462,679
41 Claims. (Cl. 88—24)

This is a continuation in part of my copending application S.N. 427,427, entitled, "Method and Apparatus for Searching an Inverted File Information System," filed Jan. 22, 1965.

This invention pertains to the subject of microfilm information recording and reading. More specifically, it is concerned with recording information in the form of a high density, small spacing, two dimensional array of spots on a record medium, and to the provision of apparatus for reading or scanning such records. Because of the close spacing of the spots (which may be as small as, and be spaced apart by 0.001 inch or less) it is important that the scanning detector be placed very precisely so as not to read an adjacent spot instead of the desired spot.

There are commercial devices on the market, such as the Miracode System marketed by the Recordak Corporation, of 770 Broadway, New York 3, N.Y., which can read spot patterns. However, the spacing and size of these spots is such that there can be wide tolerance in the relative positioning of the detector and the record without misreading the recorded information.

In my copending application S.N. 427,427, I describe several methods of controlling the position of a spot of light so as to scan a two dimensional matrix of possible spot positions. One way of doing this, as indicated therein in FIGURES 7 and 8, is to have a cathode ray tube whose spot can, by applying appropriate voltages to two sets of deflection systems, be positioned to any desired point in a two dimensional area. The control voltages may be read from pre-recorded digital information or other source. The magnitudes of the control voltages are predetermined to position the spot to the desired coordinates.

However, there are many situations where (1) the deflection sensitivity of the cathode ray tube (CRT) beam varies, or (2) is non-linear with deflection, or (3) the pattern of spots to be scanned happens to be of a slightly different scale, or (4) the record or medium carrying the pattern of spots is not positioned precisely relative to the CRT, and so on. Thus it is desirable to design a beam deflecting system which will adjust the deflecting voltages to position the CRT spot precisely to the desired position in the matrix.

Briefly, my invention involves, in the preparation of the spot record, the substantially simultaneous printing of the spots and of a series of control indicia accurately aligned with the spot pattern so as to guide the scanning spot in the reading process. By substantially simultaneously I mean that the spots and indicia are printed without substantial movement of the record medium. The important fact is that the matrix and indicia must be in precise geometric relation to each other, to a tolerance less than the spacing of rows and columns in the matrix. In the reader, or scanner, a CRT or other light source is used and the deflection voltages to control the spot are derived from the position of these printed indicia. These voltages may be reproducibly recorded to later control the spot position. In another embodiment, an image or other indication of the position of the CRT spot is superimposed on the control indicia to set the deflection of the spot to the proper value to position the CRT spot onto the proper record position. In this process, in which the deflection control voltage is obtained as the direct result of using the spot (or an image of the spot) positioned with respect to the longitudinal and lateral indicia, the positioning can be accurately accomplished even though the deflection characteristic of the SRT is nonlinear, the scale of the spot position is different, or the pattern is not accurately positioned with respect to the CRT.

It is therefore an important objective of this invention to provide a system of flying spot scanning of a record containing a two-dimensional pattern of spots in which the luminous spot can be accurately positioned to read sequentially all of the possible spot positions. This can be done irrespective of changes in the spot positioning control sensitivity of the spot source, or nonlinearity in the spot deflection system. It is also an important objective to provide a scanning system that can be rapidly adapted to scanning records of different spot spacings. It is also an important objective to provide a means for scanning a spot pattern when the record is not in the precise position that it should be relative to the light source. It is a further objective to provide a CRT spot control system that will accurately place the luminous spot on each matrix position of a record containing a pattern of spots. It is another objective to so control the spot position that it will reach a desired position on the record irrespective of a different dimensional scale of the spot position on this record, or of an improper position of the record with regard to the spot source. It is another objective to provide a type of record in which means are provided to control the position of the spot, and an apparatus and method for making said record.

Further objectives of this invention and details of its construction and operation will be made clear by the following descriptions and explanations in connection with the attached drawings which form part of this application, and in which.

FIGURES 5*a* and 5*b* represent schematic views of the scanning and recording assembly.

FIGURES 6*a*, 6*b*, and 6*c* represent time-voltage relations in the scanning process.

Figures 7A, 7B, 7C:
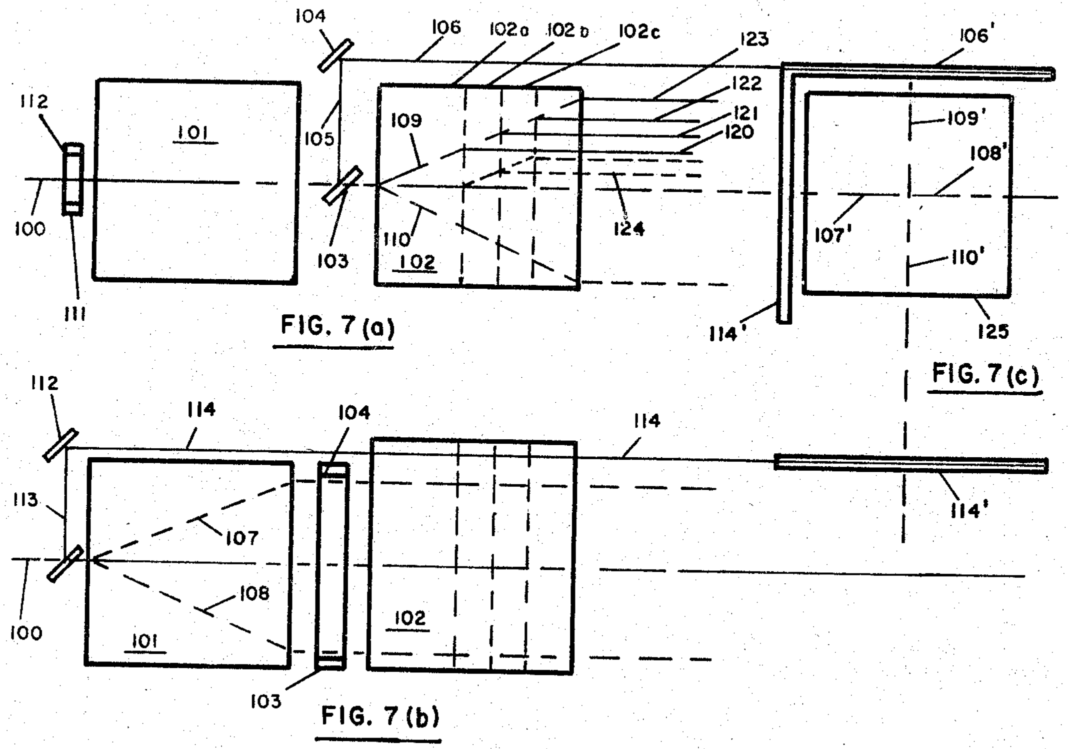

FIGURES 7*a*, 7*b*, and 7*c* represent another embodiment in which three images of the light spot are provided.

Figure 8A:
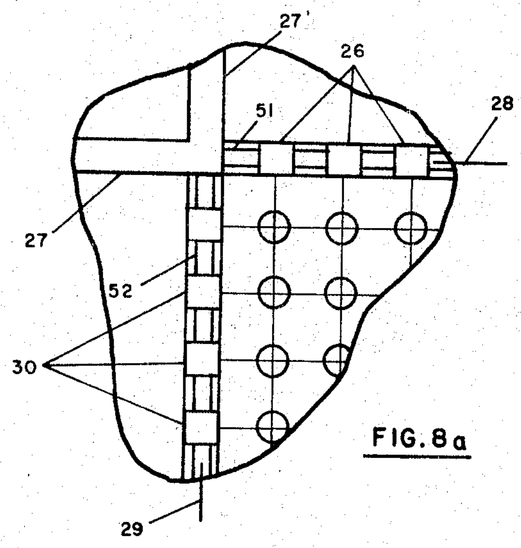
Figure 8B:
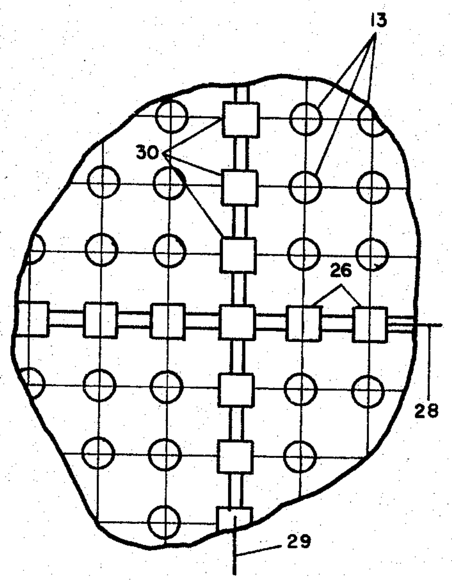

FIGURES 8*a* and 8*b* represent other embodiments of the design of scanning guide indicia in relation to the matrix of spots.

Figure 9:
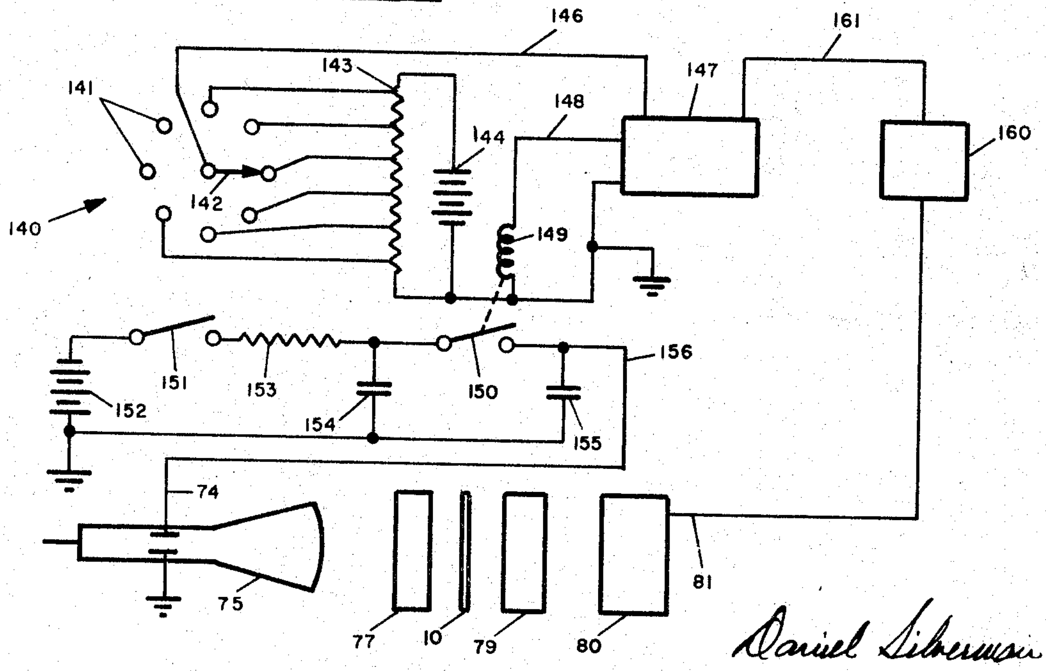

FIGURE 9 illustrates schematically how a counting circuit can be used to control the position of the moving light image to scan the spot pattern.

Figure 5:
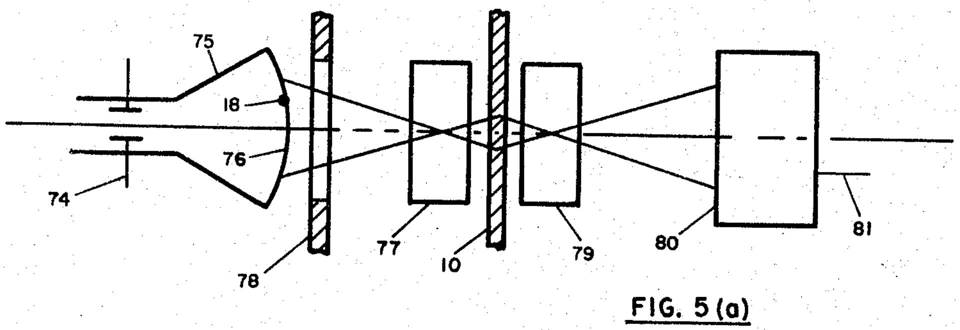
Figures 5, 10:
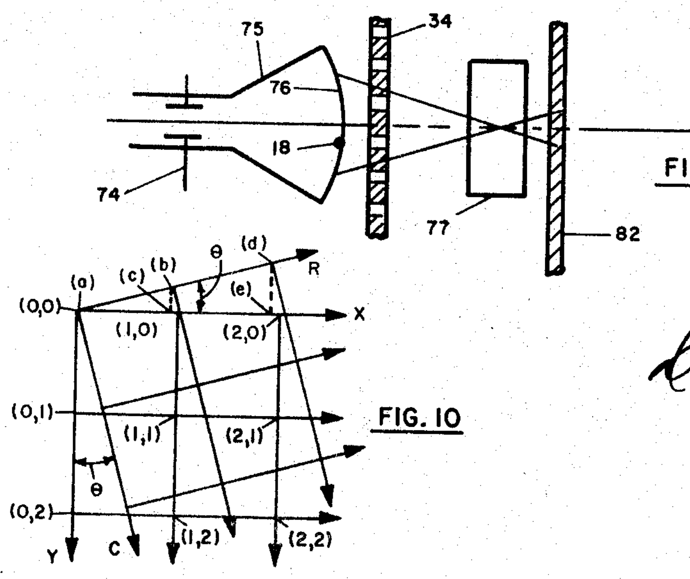

FIGURE 10 represents the matrix on the CRT face.

Figure 1:
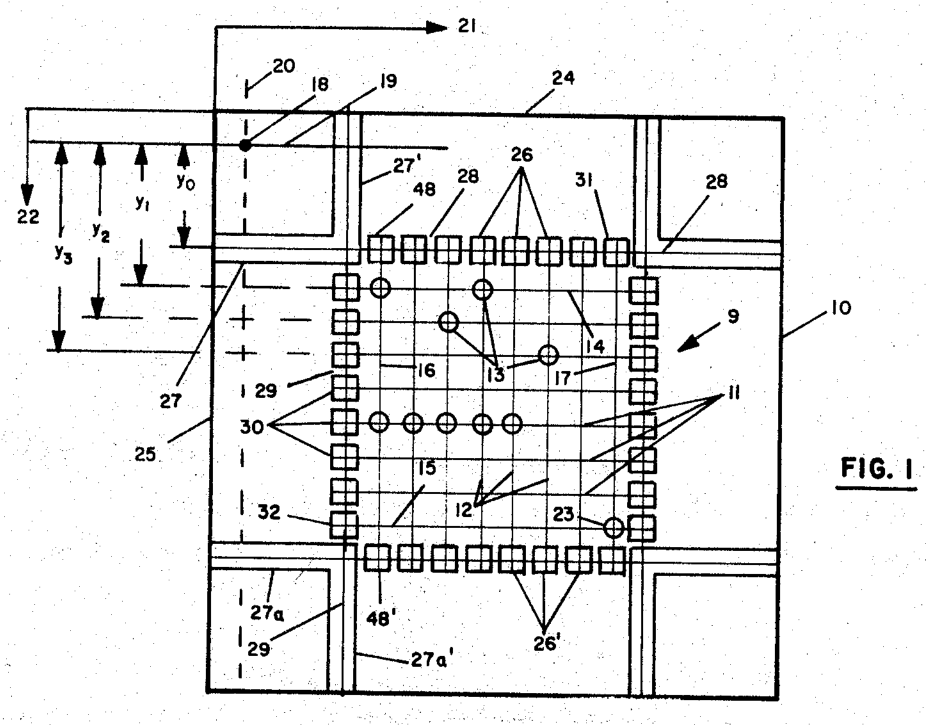
FIGURE 1 represents schematically an embodiment of a record medium for use in storing and retrieving information in this invention.

Referring now to the figures, and in particular to FIGURE 1, I show an information record medium 10 with a two-dimensional matrix of spot positions 9, arranged in rows 11 and columns 12. Some of these possible spot positions are occupied by translucent or opaque spots 13 on a background of contrasting density, color, texture, etc. These spots can be prepared photographically, electrostatically, xerographically, etc. However, for convenience, I will discuss this invention principally in terms of a photograph sheet 10 (keeping in mind all of the other possibilities). The photographic sheet will generally have translucent or transparent spots 13 on an opaque background. This matrix includes rows 14 to 15 inclusive, and columns 16 to 17 inclusive, preferably on an equal spacing. However, as will be made clear, there is no requirement for equal spacing of rows and/or columns.

Consider that a CRT is to be used as a movable spot source of light 18 as described in my copending application.

In my copending application S.N. 427,427 I show in FIGURES 7 and 8 an assembly for scanning a spot record medium. I have schematically reproduced the essence of these figures in FIGURES 5 and 2 which shows a cathode ray tube (CRT) 75 with deflection plates 74, face 76, and with CRT spot 18. The spot 18 can be moved over substantially the entire face of the CRT within a rectangular area marked by the mask 78. This spot 18 is imaged by optics shown schematically as 77 onto the record medium 10. Any light shining through the translucent spots in 10 will be imaged by the optics shown schematically as 79 onto the light sensor 80, whose output lead 81 will show by a suitable voltage when the sensor is illuminated. The art of photoelectric detection is well known and need not be enlarged upon here.

Normally, for zero voltages on the deflecting plates, the CRT spot will be approximately in the center of the CRT face 76. However, by adding suitable "bias" voltages, the spot can be controlled so that its "nominal biased" or "zero" position will be such that its image will be placed in some desired position, such as in the upper left hand corner of the record medium 10, as shown in FIGURE 1. Now to move the spot to any point in the matrix all that is needed is to provide X and Y deflection voltages. These will be unidirectional voltages since the voltages and the resulting deflections will be in one direction.

At the start, all that is known are the coordinates (that is, the rows and columns) of the points of the matrix at which the spot image is to be placed. These can be recorded on a magnetic medium, such as a sheet, strip, chip, disc, drum, or core, and by cycling through all of these coordinates, the spot can be made to travel all of the points in the matrix. But the spot will not move unless voltage is placed on the deflecting system.

The problem is to derive deflection voltages 21 to move the spot to the right any desired column 12, and voltages 22 to move the spot down to any desired row 11. All that is known is the particular row and column, such as (15, 17) that represents the spot position 23 at which the CRT spot is to be placed. Also, nothing is known about the precise voltage vs. deflection characteristic of the CRT (or other deflectable luminous source), nothing is known about the actual scale of the pattern 9, and nothing is known about the relative position of the pattern 9 with respect to the CRT, except that the nominal or bias deflection voltage will place the spot within the coordinates 24, 25, and the rectangles 27 and 27'.

In FIGURE 1, I show above the top row 14 of the matrix 9 a row 28 of rectangular spots or areas 26 of the same or different character as the spots 13, including one long spot 27 extending from the corresponding column 29 along the left side of the matrix, to the left, beyond the last possible position of the spot, coordinate 25. Similarly, the left column of spots 30 have a long spot 27' and so on. These spots of areas 26, 30 in rows 28 and 29 are coordinate indicia and index areas, and there are at least one spot or area for each row and for each column. These are discussed fully in my U.S. Patent 2,820,907, entitled Microfilm Apparatus, issued Jan. 21, 1958, and need not be discussed further here. They are indicia for the purpose of guiding the placement of the pattern 9 with respect to the scanner, or vice versa, or for guiding the scanner (in the case of a CRT spot) with respect to the pattern 9. Index areas 26 and 29 are preferably printed on the record 10 at the same time as the spots 13 are printed, so that there will be a high degree of precision in the placement of the indicia with respect to the rows and columns of the pattern 9. For example, if it is desired to position an image of the CRT spot 18 over the spot 23 in the matrix, the indicia 31 and 32 would be used to control the deflection of the beam so as to reach the spot 23. Thus the voltages to deflect the spot 18 to column 17 is that which is required to deflect it to index area 31, and similarly for index area 32.

Figure 2:
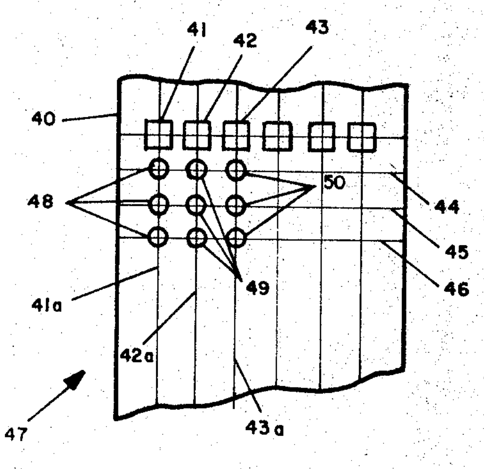
FIGURE 2 represents schematically one type of magnetic storage device that might be used to reproducibly record the deflection voltage information needed in the operation of this invention.

I have shown in FIGURE 2 a reproducible magnetic digital storage record assembly 47 similar to FIGURE 8 of my copending application S.N. 427,427, comprising a medium 40 and recording heads 41, 42, 43, etc. These heads read and record on tracks 41*a*, 42*a*, 43*a*, etc. At rows 44, 45, 46, etc., there are positions on the medium for recording, say in binary form, numbers representative of the particular row or column 11, 12, to which the CRT spot is to be placed. Heads 41, 42, 43, etc., may be multitrack head combinations with as many heads as required to record in binary form the numbers representing the particular rows and columns. Similarly, while I have shown track 41 as a single line, it may represent multiple magnetic channels, and the same for the other tracks.

Assume that the record 10, FIGURE 1, is rough positioned such that the image of the spot 18 is within the areas marked by the long dots 27 and 27', and coordinates 24, 25. The first step in positioning the spot image 18' to the position 23 is to find what voltage is required to deflect the beam or spot image to column 17. This is done by moving the spot longitudinally downward until it intersects the long rectangular spot 27. This will be evident because behind the medium 10 is photocell 80, FIGURE 5, or other radiation sensors, and corresponding optics or glass fibers to direct the light to such sensors, all of which is illustrated and described in my copending application S.N. 427,427.

Figure 6:
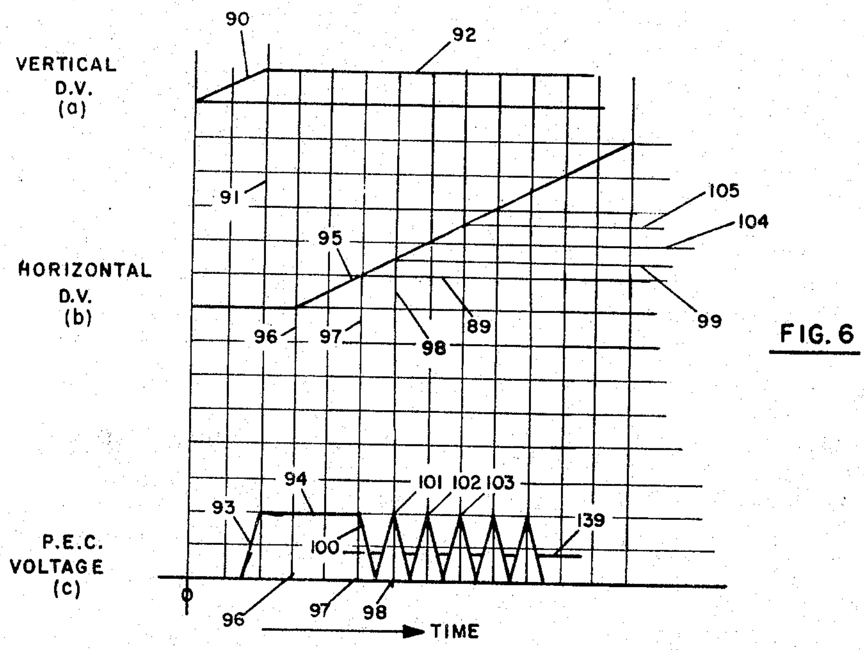

This action can be illustrated by FIGURE 6 which shows several graphs indicating the time variation of the deflecting voltages and the sensor output. Graph (*a*) shows the vertical deflection voltage to move the spot downward. The horizontal scale in each graph is time, in arbitrary units. At time zero the vertical deflection plates are given an increasing voltage 90 to deflect the beam downward. As the beam approaches area 27, light begins to reach the sensor 80 as shown in graph (*c*) as 93 and at time 91, the spot is fully centered on the area 27. At time 91 when the signal 93 from sensor 80 stops rising, and takes a constant value 94, the vertical deflection voltage 90 is held at the value 92 and this value is read and converted to digital numbers and reproducibly recorded or stored as the value $Y_0$. These procedures are well known in the art of analog to digital (A/D) converters, computers, etc., and need not be discussed any further at this time. The important thing is that the digital values representative of the voltage $Y_0$ which will deflect the beam from its "nominal biased" value at 19, 20, down to row 28 is determined and stored for later use.

Next, as shown in (*b*), FIGURE 6, at time 96 a rising deflection voltage 95 is placed on the horizontal plates and the beam moves to the right. As it approaches the end of spot 27, the light falling on 80 decreases as shown by line 100 of graph (*c*). At the time 97 when voltage 94 begins to decrease the spot image is on the Y indicium 29, and the value of voltage 95 is then 89, the value of $X_0$. As the spot moves further and becomes centered over the first index area 48 the light sensor output increases again until at time 98 it reaches maximum 101. The horizontal deflection voltage is now 99, which corresponds to the voltage $X_1'$ to move the spot from column 29 to the first spot column 16. Similarly the voltage 104 is that required to deflect the spot to the next column and so on. As the voltages 101, 102 etc., from the sensor indicates the passage of the spot over the corresponding index areas 26 (and therefore the corresponding columns of the matrix, the voltages 99, 104, 105, etc., are read, converted A/D and recorded on medium 40 at the proper address corresponding to the row 0 and columns 1, 2, 3 . . . *n* of the matrix. Or the value $X_1=99$ can be recorded, and also the differential voltages (98—89), (104—89), (105—89) etc., can be recorded.

In a similar way, the spot can be moved from its "nominal biased" position at 19, 20, horizontally to spot 27′ and then downward successively to areas 30, and the corresponding voltages read, A/D converted and recorded. Now, for each row and column of the matrix 9 we have a corresponding deflection voltage. So to place the spot on at any coordinate position on 9, all we must do is search the memory for the desired coordinates and read the deflection voltages and apply them respectively to the spot deflection system.

For simplicity in notation, I shall call the deflection voltage that will move the spot image from its zero or biased position to the intersection of indicia as $X_0$ and $Y_0$. Then the incremental voltage to move the spot image from the intersection of indicia to the columns of the matrix as $X_1$ and to the rows of the matrix as $Y_j$. Thus $X_1'$ above is, under this notation equal to $(X_0+X_1)$. Similarly, the voltage to move the spot image to row *r* and column *c* will be $(X_0+X_c)$ and $(Y_0+Y_r)$.

If in placing the medium 10 in position with respect to the spot control system (which preferably is a CRT) it is not placed exactly in the proper position, then all the voltages X and Y corresponding to the positions in the matrix will be different. Therefore, it is necessary each time that a new matrix record is placed in position, that the deflection voltages be determined. This can be very rapid since A/D converters are available on the market that can detect, measure, and convert to digital numbers as many as 30,000 or more analog voltage samples per second. Assuming a pattern of $10^6$ spots in the matrix, that is, 1,000 rows and 1,000 columns, this would mean making and recording about 2,000 measurements. This could be done in less than 1/10 second. This is generally much less time than it would take to have a servo precisely position the record, which step is eliminated by this procedure. This procedure also permits adjusting the deflection characteristics of the source to the specific scale of the matrix as well as its actual position.

There is, of course, no assurance that when the image of spot 18 is in row 28, and deflected to the column 17, say, at position 31, that as the spot is deflected downward at the same time to the row 15 (that is, to position 23) that the spot will end up directly on position 23. In other words, there can be second order nonlinearities in the deflection (electrostatic or electromagnetic) field that may cause this particular error. This error can be reduced by limiting the deflection of the spot from its reference indicia row and column 27, 27′, to only half of the total range. Thus, if the medium 10 has longitudinal and transverse indicia on all four sides, as shown in FIGURE 1, the coordinates of all points in the matrix are now within *n*/2 rows and *m*/2 columns (where *n* and *m* are the total number of rows and columns) of a reference index, and the effect of nonlinearities is reduced.

The specific pattern of index spots and lines shown in FIGURE 1 represents only one of many different types and I do not mean to indicate that this invention is limited in any way to this pattern of indicia. For example, the index areas can be separate spots 26 as shown in FIGURE 1, or a narrow line 51 joining the spots 26, or a pattern of lines joining the spots can be used as in FIGURE 8. The indicia can be rectangular arrays intersecting at one or more points outside the matrix or at a point inside the matrix, etc.

The recording medium 40, can be a sheet strip, chip, disc, drum, or similar surface carrying magnetizable material on its surface, or it can be a type of digital memory such as a core memory, well known in the computer and data processing art. The positions 48 of binary information recorded on the medium 40 correspond to the digital values of the coordinates, that is, rows and columns, corresponding to particular addresses or positions in the matrix. All points 48 on tracks 41*a*, for example, represent all the coordinates of the positions in the matrix 9.

All the values 49 recorded on tracks 42*a* would correspondingly be the digital values of the deflection voltages required to position the spot image of 18 to each of the coordinates of the positions in the matrix. These could be derived by the process outlined above, namely, positioning the CRT spot image at each index area position 26, 30, and determining the analog voltage required to deflect the spot to that point, and converting the anlaog voltage to digital value and recording the digital value on tracks 42*a*.

Figure 3:
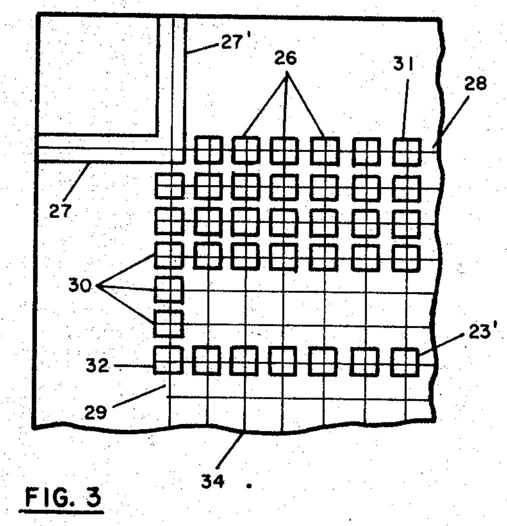
FIGURE 3 represents a type of optical mask that can be used in connection with a controllable light spot to record spot information in precise relation to scanning guide indicia.

Consider the medium 10 in FIGURE 1 with all the matrix positions 9 filled with rectangular transparent spots as in FIGURE 3. If one photographic record is made of this type, it is possible to correct for second order nonlinearity in the deflecting system for a given CRT. For example, I have shown above, how it is possible to record on medium 40, FIGURE 2, digital numbers 48 corresponding to spot position coordinate, and numbers 49, corresponding to differential voltages required to get the spot moved out along row 28, for example, to 31, etc. Consider the spot at 31. Now, keeping the same horizontal deflection we can increase the downward deflection of the spot to determine the deflecting voltage to move the spot image down toward 23′, FIGURE 3.

It may possibly be that if we apply to the beam the horizontal deflecting voltage to 31 and the vertical deflection voltage to 32, that the beam may not end up exactly on 23′. But we can, in the manner of FIGURE 6, approach 23′ from above and find what vertical voltage is required to reach 23′. If this voltage is different from that required to deflect the beam to 32, then the differential voltage can be recorded as values 50 on tracks 43*a* corresponding to the particular address. The same process is followed to determine whether the horizontal deflection voltage to 23′ is different from that to 31. If so, this differential voltage also is recorded on tracks 43*a*. This process can be followed for each point in the matrix 9. When this is completed, for each coordinate address 48, there will be a voltage in 49*a* to get the spot in proper row or column when applied alone, while values 50 will be differential voltages at each address to be added to those of 49 to correctly position the CRT spot to any desired point in the matrix.

The sum of voltages represented by 49 and 50 will provide a map of the deflection characteristics of the CRT. With more data processing capability, this deflection voltage map can be used to interpolate the true deflection voltage for every point in the field of the CRT. However, there is a distinct advantage in having the true deflecting voltage equal the sum of two voltages, one of which is a small correction, or differential voltage, due to the nonlinearity of the deflection field, while the principal voltage is obtained by scanning the indicia, determining the deflection voltages to each row and column and recording them. Having once determined the differential voltages 50, it may no longer be necessary to follow the detailed steps above for each point in the matrix, since with the same CRT, the same differential voltages should hold. In other words, the values 50 are small differential voltages due to second order effects. These will not change with different records. However, the values 49 will change with each record due to difference in positioning. Thus only values 49 need be measured for each new record.

In the positioning of the spot image onto the matrix the deflection voltages can be determined with respect to the initial, normal, zero-position of the CRT spot, or with respect to other arbitrary positions of the spot on the CRT face. One such position is the point of intersection of the guide indicia. Then for matrices of the same scale the deflection voltages with respect to the intersection of the guide indicia will be the same for all records. If the record is not positioned accurately with respect to the CRT face, then once the CRT spot is brought to the intersection point, the deflection voltage for the matrix will be the same for all records. Thus, to take care of an improperly placed record, all that need to be done is to find the two deflection voltages $X_0$ and $Y_0$, to place the spot at the intersection of the guide indicia. This can be done as described in conjunction with FIGURE 1, or by any other desired means.

If the records are placed in the scanner very precisely, so that the deflection voltages $X_0$ and $Y_0$ are the same for each record, then $X_0$ and $Y_0$ need to be determined only once. However, if the scanner does not have a precise positioning means, then the cost and time of the servo and the precise positioning of the record to the CRT face is saved. It is then necessary to determine $X_0$ and $Y_0$ for each record to be scanned.

Having determined the voltages $X_i$ and $Y_j$ to move the spot from the intersection point to each of the index areas, and recorded them, this does not have to be done for each record, unless the scale of the record matrix is different.

If the scale of the matrix is the same, but the X, Y deflection pattern is non-uniform, then second order corrections voltages $X_i$ and $Y_j$ can be determined once for all for that particular CRT deflecting system.

Thus, by breaking the resultant deflecting voltages into several parts, $X_0$, $Y_0$, $X_i$, $Y_j$, and $X_{i'}$, $Y_{j'}$, a minimum of duplication of measurements need be made in scanning a multiplicity of records.

What I have described in the foregoing broadly is a method of exploring the deflection voltage field required with a given CRT and a given record matrix including longitudinal and lateral position indicia corresponding to each of the rows and columns. The matrix can be of any desired scale and positioned only coarsely with respect to the CRT. Before the scanning operation proceeds, the deflection voltages are calibrated so that thereafter the spot can be positioned precisely to a desired point in the matrix. In the next embodiment of this invention, I will show how the steps of calibration and scanning can be done in parallel instead of in series.

Figure 4:
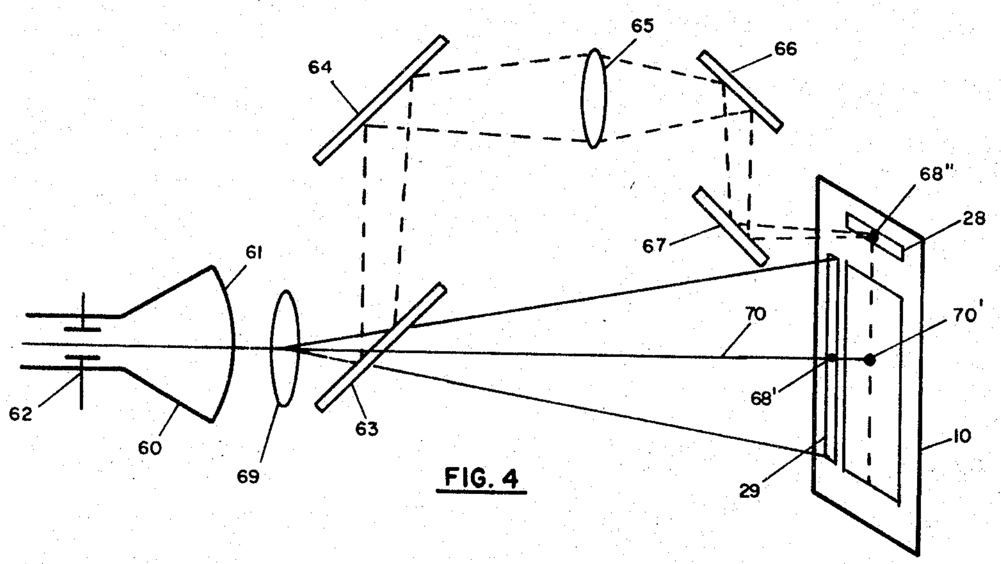
FIGURE 4 represents an embodiment in which in addition to the principal image of the moving light spot, two additional images are provided that are constrained to move only along the control indicia respectively.

In FIGURE 4, I show a CRT 60 with face 61, and deflecting plates shown schematically as 62 capable of deflecting the spot the full range from rows 14 to 15. Part of the light from the CRT is reflected by a partially silvered mirror 63, prism or corresponding beam splitter, up to mirror 64, then to cylindrical lens 65, mirrors 66 and 67 to be focused along line 28. The spot should image on line 28 irrespective of the vertical deflection voltage on the plates 62. Thus while the direct beam 70 moves up and down over the medium 10, the spot 68″ stays along the row 28. However, both spots 68″ and 70 participate in the same horizontal deflection. In a similar way, there is a corresponding set of mirrors to focus the CRT spot 68′ along a vertical column 29 irrespective of the horizontal deflection of the beam 70. Thus, in tracing out the coordinates of matrix 9 by beam 70, spots 68′ and 68″ will simply trace out the corresponding coordinates of the desired point in the matrix. As explained in connection with tracks 41*a* of FIGURE 2, the signal to the CRT deflection control is simply a number representing the row and column desired. The deflecting plates are then given increasing voltages so that the spot will move horizontally and vertically, spot 68″ moves along row 28 while spot 68′ moves along column 29. Simple counters can be used to count the number of index areas 26 and 30 that spots 68′ and 68″ respectively, cross. When the count is the same as the coordinates of the desired matrix position, further deflection of the beam is stopped.

Thus, by the use of auxiliary light spots or images derived from the principal CRT spot, which auxiliary spots move along lateral and longitudinal indicia, it is possible to place the CRT spot on a particular address by simply determining the serial number of the row and column desired, and counting the number of index areas 26 and 30 which are passed by the spots 68″ and 68′.

The real advantage of these methods lies in the fact that the CRT beam or spot is controlled by the control indicia which are in precise alignment with the rows and column positions in the matrix.

In my copending application S.N. 427,427, I point out how it is possible to deflect a beam of luminous or other type of radiation, such as that from the impingement of a cathode ray beam on a CRT upon a phosphor-coated surface, and deflecting the cathode rays by means of electrostatic or magnetic fields. It is, of course, possible also to deflect the image of a fixed luminous spot by means of rotating mirrors or prisms or the equivalent, as illustrated in my U.S. Patent 2,820,907. With the rotating mirrors it is possible to deflect a beam of radiation other than luminous radiation, such as a beam of ultraviolet or infrared radiation, concentrated beam of infrared radiation, heat rays such as might be provided by lasers, or other well known sources can be used for both detection and recording.

In FIGURE 5, I show an optical information assembly including a CRT 75 with luminous spot 18 on its face 76, a mask 78 in front of the face, an optical assembly 77 adapted to place on the record medium 10 a replica or image of the spot 18. The purpose of placing the image of 18 on the record medium might be to explore the pattern of spots previously recorded on the medium, in which case the additional optics 79 and radiation detector 80 can be used to indicate when the image of luminous spot 18 is superposed on a particular translucent spot on the record. However, if a previously unrecorded radiation sensitive sheet or card 82 is placed in the position of 10, the luminous spot image will make a change in the character of the medium at that position and will record a spot. By positioning the luminous spot image in other points of the matrix, the desired pattern of spots can be recorded.

In positioning the spot 18 to the several positions to record the pattern, it is necessary to determine the proper deflection voltage required to position the spot to each row or column of the matrix. To do this, I propose to substitute for the mask 78 the mask or record 34 of FIGURE 3, which contains openings at each point of the matrix, and each point in the lateral and longitudinal indicia corresponding to each row and column of the matrix. If the record medium 10 is removed, and the CRT spot moved along row 28 of mask 34, as the luminous spot passes each index area, light will pass to sensor 80, and the deflection voltage can be determined and recorded corresponding to each row and column. Thereafter, applying these deflection voltages in pairs, the luminous spot can be positioned to any point in the matrix. Then an unrecorded medium 82 is placed in the position of 10, the spot 18 successively placed in the positions of all points 26 and 30 in the control indicia and those points in the matrix which form the desired pattern. The resulting record sheet 82 is then removed and processed or developed, as necessary, to make a permanent record of the pattern in conjunction with, and in precise relation to the control indicia.

By the use of the mask 34 of FIGURE 3, the exact shape and placement of the luminous spots 18 in the indicia and in the pattern are provided for. Once the mask is constructed precisely, the resulting records 82 will all be precise in their spot relations between the matrix and the indicia. It is, of course, necessary, once the recording process is underway, to avoid moving the sheet 82 with respect to the mask 34 until the recording is complete.

It will be clear that while it is desirable to have the mask 34 so as to provide a precise shape, size, and position of each spot in the matrix and the indicia, and all in precise relation to each other, by proper control of the CRT spot, and care in the application of deflection voltages, it is possible to obtain a satisfactory, though perhaps less precise record of the spot positions and indicia.

The record sheet 82 which is used to make the record 10 can, of course, be a conventional silver halide photographic sheet which is affected by the luminous radiation from the spot 18. It can also be a photoconductive sensitive coating on a paper or plastic or other material such that the radiation from the spot 18 falling on the sheet distributes electrical charges in such a way as to form the desired character of spots when this pattern is developed by electrostatically sensitive toner, as in the well known xerographic process of recording.

It is also possible by the use of a concentrated beam of energy or radiation that can be converted to heat, such as infrared radiation, or the concentrated high-energy-density-beams from lasers, to record on thermo-chromic materials, such as those used in the well known thermal copying processes such as the Thermofax copying devices manufactured by the Minnesota Mining and Manufacturing Company, of St. Paul, Minnesota, and others. These thermo-chromic materials can be applied to sheets or cards of plastic or paper or the like. Also, the concentrated energy beam can be used to evaporate and remove (over a small area) a very thin layer of metal formed on a plastic sheet, for example, to provide a pattern of translucent spots on an opaque sheet.

There is another photosensitive process utilizing the Kalvar process in which ultraviolet light will release from chemicals in a prepared coating on a sheet of plastic, microscopic amounts of nitrogen. By heating the sheet in those areas where the nitrogen has been released, it is expanded, forming a large number of tiny gas bubbles, which act to diffract and scatter incident light, and make the sheet act opaque in those spots. Kalvar film is manufactured by the Kalvar Corporation, of 909 S. Broad St., New Orleans, La. Kalvar was described in the paper, "The Basis of the Kalvar System of Photography," by Dr. Robert T. Nieset, which was presented at the Tenth Annual Convention of the National Microfilm Association, April 1961, and published in the proceedings of that meeting.

In the normal use of Kalvar, the information to be recorded is present in the distribution of incident ultraviolet light (such as by copying a conventional developed silver halide image with ultraviolet light), and the picture (information) is developed by heat applied more or less evenly to the entire area. What I propose to do is illuminate the entire record medium 82 uniformly with ultraviolet light, and to develop only those spots of the pattern by localized heating, by directing a focussed laser beam (or other intense radiation) to the desired points of the matrix. This overcomes the normal requirement of Kalvar film that it have an *intense* ultraviolet irradiation due to its low photographic sensitivity. At the same time, the intense, small, high-energy beam available from a laser, though not in the ultraviolet spectrum, can be used in such a way that its heat energy can create the spot record. The low value of gradiness, the permanent character, and the rugged mechanical properties of Kalvar film can thus be made available for the preparation of high density, permanent spot patterns for information storage.

It will be clear in this novel method of recording and reading spot patterns, that I visualize the use of various forms of radiation, in the visible spectrum, in the ultraviolet and infrared areas, high intensity high energy heat radiation, and so on. With these forms of radiation I require, of course, suitable sources, suitable record media sensitive to these forms of radiation, and able to control these forms of radiation, and also, suitable detectors of this form of radiation, all of which are available on the market. It will be clear also, that the use of a laser beam can include use of its luminous spectrum, for photoelectric detection of the position of the beam (along the indicia) while utilizing the heat energy of the beam to make a suitable recording of the beam position. Since information on the nature and use of these luminous sources or heat sources is available in publications and is well known in the art, there is no need to describe them further at this time.

Utilizing a high energy density beam such as that from a laser, or other source, suitably concentrated by appropriate optics, it is possible to deflect the beam in two coordinates by the use of two rotating mirrors adapted to rotate about suitable axes respectively perpendicular to the rows and columns of the matrix. These systems are well known in the art. A portion of such a system is shown in my U.S. Patent 2,820,907 in which a deflecting mirror is controlled by a servo, which, of course, could be made to deflect the mirror in proportion to the applied deflection voltage. A similar mirror system would be used to deflect the beam along the other coordinate.

It is also possible to deflect an optical beam by the use of an optical modulator and a uniaxial crystal. By the use of a plurality of such crystals suitably designed to deflect the beam by distances proportional to digital numbers, it is possible to control the beam to a large number of possible positions by a limited number of crystals. Spot position densities of up to one million per square inch are possible. This was mentioned briefly in my copending application S.N. 427,427. It is described fully in a paper, "Digital Light Deflection," by T. J. Nelson, Bell System Technical Journal, vol. XLIII, No. 3, May 1964, pp. 821–845.

In FIGURES 7(*a*) and 7(*b*) I show schematically how these crystals may be used to deflect an image of the spot to any one of the points in the matrix (as is discussed in the above reference). At the same time, however, I keep other images of the spot confined to motion along the control indicia.

In FIGURE 7(*a*) I show schematically as 101 and 102 arrays of modulators and crystals such as described in the above reference. I believe that the principles involved are well enough described in that reference, so that no further description is required of the internal means by which the deflection is accomplished. Suffice to say that an entering pencil of light 100 in passing through element **102*a* can be deflected as pencil 109 by appropriate potentials applied to the crystals, etc. If only element 102*a* is energized, the pencil will emerge as pencil 120, parallel to the original pencil 100 but displaced by a distance which is a function of the element 102*a*, etc. If, in addition, the element 102*b* is energized, the pencil will emerge as 121**, and so on. By design and control of the various elements, etc., the entering pencil of light can be deflected, in one plane, parallel to itself by any desired increments of distance, as small as one-thousandths of an inch. In a similar way, FIGURE 7(*b*) shows that array 101, operating in a plane at right angles to that of FIGURE 7(*a*) can deflect the pencil parallel to itself in the plane of 101. Thus, by control of the two crystal arrays 101 and 102, the entering pencil 100 can be positioned at any point in a two-dimensional grid or matrix 125, FIGURE 7(*c*).

In addition to the positioning of the pencil to a desired point in the area 125, I wish also to have an image, or a part, of the entering pencil 100 constrained to move along lines 106' and 114', parallel respectively to the rows and columns of the matrix 125. Thus, the lateral and longitudinal coordinates of the exit pencil, say 120 in area 125 is shown by the position of the spots of light in the indicia lines 106' and 114'.

While the exit pencil 120 must pass through both arrays 101 and 102 to be given two-dimensional deflections, the images scanning index areas must individually by-pass one or the other of the crystal arrays so as to have only one plane of deflection. This is shown schematically in FIGURE 7. Partially silvered mirror 111 and mirror 112, or the equivalent, are arranged to take part of the light from the entering pencil of light 100 to by-pass the first array 101 and then as pencil 114, enter the second array 102. This pencil is then deflected by the second array 102 into a multiplicity of positions along line 114'. Similarly, long, partially silvered mirror 103 and mirror 104 take the deflected pencil 107 or 108, for example, from array 101 and carry it around the edge of array 102 to provide spots along the line 106'. Thus as the exit pencil, for example, 120, moves over the area 125, corresponding spots of light 106 and 114 move along 106' and 114' to show the individual coordinate deflections of the pencil 120. Thus the positions of 106 and 114 can be used to indicate or determine the coordinates of the spot 120.

In FIGURE 9, I show a variation of the embodiment of FIGURE 5 in which the output 81 of the photoelectric sensor 80 goes to a counter unit 160. This is a type of device, which is available on the market in many commercial forms, and is used extensively in the computer art, which will take a series of electrical pulses and convert them to a unidirectional voltage, the magnitude of which is proportional to the number of pulses. Thus the voltage on the line 161 is proportional to the number of flashes of light recorded on 80 as the image of the moving spot traversing the guide indicia on the record 10 passes each of the index areas.

Switch 140 comprises a contact arm 142 and a multiplicity of contacts 141, each of which are connected to taps on a potentiometer 143 connected to battery 144. Thus the line 146 carries a potential from the contact arm dependent on which contact it is connected to and thus to which tap on the potentiometer it is connected. The taps, voltage 144 and contacts 141 can be designed such that by setting the contact arm 142, a voltage will be provided on 146 corresponding to a predetermined number of counts, and thus a particular row or column of the matrix.

The unit 147 is a comparison device which compares the voltage on 161 with that on 146. This is commonly used in computers and control devices and need not be described further. When the two voltages are equal, voltage from a separate source, not shown, is placed by line 148 on relay coil 149, which pulls in and opens switch 150.

Battery 152, through switch 151 applies voltage through resistance 153 to condenser 154. Thus the voltage across 154 increases with time after the closing of 151. The voltage across 154 is transferred to condenser 155 by switch 150. The voltage across 155 is fed by line 156 to deflection plates 74 of CRT 75. Thus when 150 is closed, the deflection plates 74 have impressed on them an increasing voltage as soon as 151 is closed. As this voltage increases, the beam deflects and the spot image traverses along the index area array, and as it passes each area 26 (and 30), light passes through to 80, and pulses of voltage are fed to 160 by 81, which generate a step-wise increasing voltage. When this voltage (on 161) equals the preset voltage on 146, the relay 149 closes, opening switch 150 and holding the voltage on 155 and 74 at that value just preceding the opening of switch 150. It is seen that a counter system of this type can be used to deflect the CRT spot along the line of index areas to a specific area, supplied only by the serial number of the row or column.

It will be clear to one skilled in the art that two adjustable voltage sources (that might each be as simple as a battery and a potentiometer) can be provided, one to control the X deflection of the spot image (across columns 12) and the other the Y deflection (across rows 11), Now, if the record 10 is positioned so that its matrix coordinates are exactly parallel to the X and Y deflection axes of the CRT, it is possible, once the CRT spot image is placed at the intersection of indicia, to move the spot along the X indicium without changing the Y deflection voltage, and vice versa. However, if the record matrix is *not* positioned so that the X indicium is parallel to the X deflection axis, then to move the spot image along the indicia requires (effectively) simultaneous X and Y deflection voltage changes. The two separate adjustable voltage sources can be used for this purpose.

Consider FIGURE 2 in which I have shown three sets of recording tracks 41*a*, 42*a*, and 43*a*. The X and Y coordinates of the positions in the matrix are recorded on tracks 41*a*. On tracks 42*a* are recorded the X and Y deflection voltages to move the spot image from the intersection of indicia (I), to each of the index areas. The values of $X_0$ and $Y_0$ to deflect the spot image to (I) can also be recorded on tracks 42*a*. The third set of tracks 43*a* (as mentioned previously) can be used to record second order correction deflection voltages due to nonlinearity in the deflection system. If we consider that these correction voltages are small enough to be neglected, we can then use these tracks 43*a* for other purposes (or other tracks can be provided) as will be explained below.

If all the records 10 are to the same scale, then the deflection voltages recorded on tracks 42*a* need only be determined once. Thereafter, as new records are put into place, all that is required is to determine $X_0$ and $Y_0$, the deflection voltages to place the spot image to (I). However, if the record is not precisely positioned, and particularly if the matrix axes are not parallel to the CRT axes, it is necessary to determine values of X and of Y voltages for each index area. For example, to move the spot image along the X indicium, row 28, involves application of a Y voltage as well as an X voltage. It is possible by the two manual controls described earlier, to control the movement of the spot image along the indicia.

In FIGURE 10, I show a rectangular matrix (X, Y) comprising the rows (0,0), (1,0), (2,0); (0,1), (1,1), (2,1), and (0,2), (1,2), and columns (0,0), (0,1), (0,2); (1,0), (1,1), (1,2); and (2,0), (2,1), (2,2). These represent the matrix on the CRT face. Superimposed on this matrix is another matrix, (R, C) of the same scale as (X, Y) and coincident at its point (*a*) to point (0,0). The rows and columns of (R, C) are rotated through angle $\theta$ with respect to those of (X, Y). The matrix (R, C) is on the record medium and carries the control indicia on row R and column C.

The problem, when a new record is placed in the CRT scanning system, is to determine as simply and as quickly as possible the voltages to be applied to the X and Y deflection systems so as to position the spot image to any desired point in the matrix. We will assume that the record is positioned at random in X and Y and $\theta$. The first step is to determine and record the values of $X_0$ and $Y_0$, the deflection voltages required to position the spot image to the intersection (I) of indicia. Then the spot image is moved in X and Y in such a way (as is well known in the art) as to move along line R until point (*b*), the first index area is reached. This will require an X voltage $X_1$ proportional to (*ac*) and a Y voltage $Y_{X1}$ proportional to (*bc*). The spot image is then moved to point (*d*), with corresponding voltages $X_2$ proportional to (*ae*) and $Y_{X2}$ proportional to (*de*). This process is completed for all the index areas in the R indicium.

In the same way the spot image is moved from (*a*) to each of the index areas on indicium C. These are $Y_1$ and $X_{Y1}$ for point (*f*), $Y_2$ and $X_{Y2}$ for point (*k*), and so on. All of these voltage values can be recorded reproducibly in relation to their coordinates, in some form, such as the following:

| Coordinates, Tracks 41*a* | | Voltages, Tracks 42*a* | | | | Voltages, Tracks 43*a* | |
|---|---|---|---|---|---|---|---|
| I | II | III | IV | V | VI | VII | VIII |
| 0 | 0 | $X_0$ | 0 | $Y_0$ | 0 | 0 | 0 |
| 0 | 1 | $X_0$ | 0 | $Y_0$ | $Y_1$ | $X_{Y1}$ | 0 |
| 0 | 2 | $X_0$ | 0 | $Y_0$ | $Y_2$ | $X_{Y2}$ | 0 |
| 1 | 0 | $X_0$ | $X_1$ | $Y_0$ | 0 | 0 | $Y_{X1}$ |
| 2 | 0 | $X_0$ | $X_2$ | $Y_0$ | 0 | 0 | $Y_{X2}$ |
| 1 | 1 | $X_0$ | $X_1$ | $Y_0$ | $Y_1$ | $X_{Y1}$ | $Y_{X1}$ |
| 2 | 2 | $X_0$ | $X_2$ | $Y_0$ | $Y_2$ | $X_{Y2}$ | $Y_{X2}$ |
| *n* | *m* | $X_0$ | $X_n$ | $Y_0$ | $Y_m$ | $X_{Ym}$ | $Y_{Xn}$ |

In the general case, to deflect the spot image to a point in the matrix will require placing on the X deflection system the sum of three voltages $(X_0+X_n+X_{Ym})$ derived from tracks III, IV, and VII, and on the Y deflection system the sum of three voltages $(Y_0+Y_m+Y_{Xn})$ from tracks V, VI, and VIII.

If the angle $\theta$ in FIGURE 10 in zero, then $X_{Ym}$ and $Y_{Xn}$ will all be zero. If the spacing between all columns is the same, then $X_n=nX_1$ and if the spacing between all rows is the same then $Y_m={}_mY_1$, if the deflecting systems are linear. In that case only the voltages to place the spot image to the first X and Y index areas need be measured. However, this index system and voltage measuring and recording system is fully flexible and can place the spot image accurately to any point in the matrix even though the record is only roughly positioned in X, Y, and $\theta$.

Although a number of embodiments of the present invention have been illustrated and described, it will be obvious to those skilled in the art that many modifications, variations, and equivalents of this invention may be made without departing from the spirit and the scope thereof. For example, many variations in the exact form of the indicia, illustrated by way of example in FIGURES 1, 3, 8*a*, and 8*b*, may be used, depending on the requirements of the problem and on the details of the scanning apparatus.

Also, the pattern of spots displayed on the matrix of possible spot positions can be composed of disconnected or isolated spots of a range of detectable character corresponding to the binary quantities 0 and 1. The patterns can also be continuous lines, showing at adjacent points along the lines, variation in character over a greater range than binary quantities. For example, the pattern of spots could be a multiplicity of lines of variable density or variable area photographic recording. Since other variations will occur to one skilled in the art, only such limitations should be placed on the scope of this invention as are indicated in the appended claims.

I claim:

1. The method of scanning a pattern of spots on a record medium, said spots comprising areas of a character distinguishable from that of the medium itself, said spots arranged in a two-dimensional matrix of possible spot positions, said medium including, precisely placed with respect to said matrix, coordinate guide indicia parallel to the rows and columns of said matrix, said indicia including index areas corresponding to and in alignment with each of the rows and columns, said pattern exposed to an image of a spot source of radiant energy, movable in each coordinate X and Y, in response to corresponding deflection voltages, the improvement comprising, (a) determining the deflection voltages $X_0$ and $Y_0$ required to position the spot image to the intersection of the guide indicia, (b) positioning the spot image at the said intersection, (c) determining the additional deflection voltages $X_i$ and $Y_j$ required to move the spot image from the said intersection point to each of the index areas, in turn, and (d) reproducibly recording the values of $X_i$ and $Y_j$.

2. The method of claim 1 with the additional step comprising applying to the deflection system voltages $(X_0+X_i)$ and $(Y_0+Y_j)$, whereby the spot image will be positioned to the intersection of the *j*th row and the *i*th column on said record.

3. The method as in claim 1 with the additional steps comprising (a) determining the differential deflection voltages $X_i'$ and $Y_j'$ such that when the sum voltages $$(X_0+X_i+X_i')$$

and $(Y_0+Y_j+Y_j')$ are applied to the spot deflection system, the spot image will be accurately positioned to the intersection of the *j*th row and the *i*th column irrespective of possible nonlinearity of the deflection system, and (b) reproducibly recording the differential voltages $X_i'$ and $Y_j'$.

4. In the method of scanning a pattern of spots on a record medium arranged in a two-dimensional matrix of possible spot positions, said medium placed in a scanner assembly and including, precisely placed with respect to said matrix, coordinate guide indicia parallel to the rows and columns of said matrix, said indicia including index areas corresponding to and in alignment with each of the rows and columns, said pattern exposed to the image of a spot light source movable in two coordinates, X and Y, under the control of deflection voltages, the improvement comprising, (1) placing a first record in scanning position in said scanner assembly, (2) determining the deflection voltages $X_0'$ and $Y_0'$ required to position the spot image at the intersection of said guide indicia of said first record, (3) recording the values of $X_0'$ and $Y_0'$ for said first record, (4) determining the values of deflection voltage $X_i$ and $Y_j$ required to move the spot image from the intersection point to each of the index areas in said control indicia, (5) recording said values of $X_i$ and $Y_j$, (6) replacing the first record with a second record in which the scale of the matrix is the same as for the first record, (7) determining the deflection voltages $X_0''$ and $Y_0''$ required to position the spot image at the intersection of said guide indicia of said second record, (8) recording the values of $X_0''$ and $Y_0''$, and (9) applying to the deflection system voltages equal to $(X_0''+X_i)$ and $(Y_0''+Y_j)$, whereby the spot image will be positioned at the intersection of the *j*th row and the *i*th column on said second record.

5. In an information system for scanning a pattern of spots on a record medium, said pattern arranged in a two-dimensional matrix of spots, said record including also lateral and longitudinal guide indicia comprising markings accurately placed with respect to and parallel respectively to said rows and columns of said matrix, said indicia including marking areas corresponding to each row and column of said matrix, said system including also energy spot means, means for applying electrical voltages to deflect said spot, means for projecting a first and second image of said spot constrained so as to follow along said lateral and longitudinal indicia respectively on said record medium and means to project a third image of said spot onto said pattern of spots on said record, said three images being precisely related to each other such that when said first and second images reach marking areas corresponding respectively to a particular row and a particular column, said third image will be on the same row and column, the method of placing said third image onto a predetermined point in said matrix having the coordinates of the *r*th row and the *c*th column comprising, (1) deflecting the energy spot laterally so that the first image traverses the lateral indicium, (2) determining when the first image has reached the $c$th marking area corresponding to the deflection of the third image to the $c$th column,
(3) maintaining the lateral deflection voltage to keep the first image on the $c$th marking,
(4) deflecting the luminous spot longitudinally so that the second image traverses the longitudinal indicium,
(5) determining when the second image has reached the $r$th marking area corresponding to the deflection of the third image to the $r$th row, and
(6) maintaining this longitudinal deflection voltage to keep the second image on the $r$th marking, whereby the third image will be placed and remain on the intersection of the $c$th column and the $r$th row.

6. In an information system for scanning a pattern of spots on a record medium, said pattern arranged in a two-dimensional matrix of spots, said record including also lateral and longitudinal guide indicia comprising markings accurately placed with respect to and parallel respectively to said rows and columns of said matrix, said indicia including marking areas corresponding to each row and column of said matrix, said system including also energy spot means, means for applying electrical voltages to deflect said spot, means for projecting a first and second image of said spot constrained so as to follow along said lateral and longitudinal indicia respectively on said record medium and means to project a third image of said spot onto said pattern of spots on said record, said three images being precisely related to each other such that when said first and second images reach marking areas corresponding respectively to a particular row and a particular column, said third image will be on the same row and column, the method of positioning said third image to a desired position in said matrix, comprising,
(1) deflecting the energy spot laterally across the array of columns until the first image of said spot traveling along the lateral index reaches the index marking corresponding to the column of the desired position in said matrix, and maintaining this voltage, and
(2) deflecting the energy spot longitudinally across the array of rows until the second image of said spot traveling along the longitudinal index reaches the index marking corresponding to the row of the desired position in said matrix, and maintaining this voltage whereby said third image will be positioned at the spot in said matrix corresponding to the desired row and column.

7. In an information system in which information in the form of a pattern of spots of distinguishable character is arranged on a matrix of possible spot positions on a record medium which includes also guide indicia precisely placed with respect to said matrix and including at least one index area for the first row and for the first column, said record adapted to be positioned with relation to a movable spot source of radiation whose spot is imaged on said medium and by control of deflection voltages in two coordinates can be positioned onto said matrix, the method of scanning said spot pattern comprising;
(a) determining and reproducibly recording the deflection voltage $X_0$ and $Y_0$ to place the spot image to the intersection of said indicia,
(b) determining and reproducibly recording the deflection voltages $X_1$ and $Y_{X1}$ which, applied respectively to the X and Y deflection systems will move the spot image from said intersection to the first X index area,
(c) determining and reproducibly recording the deflection voltages $Y_1$ and $X_{Y1}$ which, applied respectively to the X and Y deflection systems will move the spot image from said intersection to the first Y index area, and
(d) applying deflection voltages $(X_0+nX_1+mX_{Y1})$ to the X deflection system and $(Y_0+mY_1+nY_{X1})$ to the Y deflection system, whereby the spot image will be placed to the coordinate $X=n$, $Y=m$, of the matrix.

8. The method of claim 7, with additional index areas corresponding to all values of $X_n$ and $Y_m$, and the additional steps of
(e) determining and reproducibly recording values of $X_i$ and $Y_{Xi}$ for all values of $X_i$ along the X indicium,
(f) determining and reproducibly recording values of $Y_j$ and $X_{Yj}$ for all values of $Y_j$ along the Y indicium, and
(g) applying voltages $(X_0+X_i+X_{Yj})$ and $$(Y_0+Y_j+Y_{Xi})$$

whereby the spot image will be placed at the coordinate $X_i$, $Y_j$ in the matrix.

9. In the method of scanning a pattern of spots on a record medium arranged in a two-dimensional matrix of possible spot positions, said record including lateral and longitudinal guide indicia impressed on said medium in precise relation so said matrix and including distinctive index areas opposite each row and column of said matrix, said scanning system including movable radiant energy spot means imaged on said record and capable of being positioned by the application of suitable deflection voltages, the improvement comprising;
(a) positioning the spot image into a space outside of said matrix and bounded by extensions to said guide indicia,
(b) moving said spot image along the first coordinate direction until it reaches the extension of the second guide indicium, and determining this first voltage,
(c) while keeping this first voltage on the first deflection system, applying an increasing deflection voltage along the second guide indicium until the spot image reaches the intersection of indicia, and determining this second voltage, and
(d) reproducibly recording the said first and second voltages.

10. The method of recording a spot pattern on a radiant energy sensitive record medium by deflecting radiant energy spot source in accordance with a given matrix of rows and columns, projecting radiation from said spot through translucent areas on an opaque mask means placed in front of said source, said mask having translucent areas at each point in said matrix, and guide indicia comprising arrays of index areas parallel respectively to said rows and columns and at least opposite each row and column, said radiant energy projected through said mask and imaged on said recording medium, and including means to detect said image, comprising,
(1) placing said mask in position before said source,
(2) deflecting said spot across each of said index areas sequentially,
(3) determining the deflection voltages required to position the spot at each index area,
(4) reproducibly recording the values of deflection voltage in relation to the coordinates of each index area,
(5) placing said recording medium in position,
(6) adjusting the deflection voltages corresponding to the desired row and column of said record spot, and
(7) brightening said spot, whereby said spot image will fall on said record medium and said spot will be recorded.

11. The method as in claim 10 including the step of positioning the spot source sequentially at each of said index areas and brightening said spot to record on said medium images of each of said areas.

12. In a system for scanning an information record on which said information is recorded in the form of a closely spaced pattern of spots of a detectable character different from that of the record medium, arranged in a two-dimensional matrix of possible spot positions, said record carrying also lateral and longitudinal guide indicia accurately placed with respect to the matrix positions and having marking areas corresponding to each of the rows and columns of said matrix, the improvement comprising, (1) luminous spot means, (2) means to project said spot means onto said record means, (3) means to deflect said spot in two dimensions in response to deflection control voltages so as to move said projected spot over at least the entire area of said matrix and said indicia, (4) memory means for storing numerical information, (5) information stored in said memory representing the lateral and longitudinal coordinates of at least part of the possible spot positions in said matrix, (6) information stored in said memory representing the deflection voltages required to deflect said spot to each of said marking areas on each of said guide indicia in accordance with the coordinates of said marking areas, (7) means to enter said memory with said coordinate values to read the corresponding deflection voltages, and (8) means to apply said deflection voltages to said spot deflection means.

13. In a system for scanning a pattern of spots arranged in a two-dimensional matrix of spots on a record medium, said record including also lateral and longitudinal indicia comprising markings accurately placed with respect to and parallel respectively to said rows and columns of said matrix, said indicia including marking areas corresponding to each row and column of said matrix, the improvement comprising an energy spot means, means for applying electrical voltages to deflect said energy spot, means for projecting a first and second image of said spot constrained so as to follow along said lateral and said longitudinal indicia respectively, and means to project a third image of said energy spot onto said pattern of spots, said three images being precisely related to each other such that when said first and second images reach marking areas corresponding to a particular row and a particular column respectively, said third image will be on the same row and column.

14. The apparatus of claim 13 in which the energy spot means is a cathode ray tube and said first and second images are derived from the CRT spot by mirrors and cylindrical lenses.

15. The apparatus of claim 13 in which the energy spot means is deflected by means of arrays of optical modulators and uniaxial crystals.

16. Apparatus as in claim 13 including means to brighten said energy spot when said third image is on the desired row and column.

17. An information system comprising:

(1) information record means comprising (a) a record medium, (b) an array of rows and columns defining a two-dimensional matrix of possible positions on said medium, (c) a pattern of spots of recognizable character arranged on the row and column intersections of said matrix, (d) lateral and longitudinal guide indicia parallel respectively to and coextensive with said rows and columns of said matrix, (2) spot energy means, (3) means to deflect said spot parallel to the rows and columns of said matrix in response to deflection control means, (4) means to project said energy spot onto said guide indicia, (5) spot detection means to detect the position of said spot on said guide indicia, and (6) spot control means responsive to said spot detection means to control the position of said spot in said matrix.

18. The apparatus of claim 17 in which said indicia comprise arrays of isolated index areas.

19. The apparatus of claim 17 in which said indicia comprise a multiplicity of isolated index areas connected by a pattern of lines.

20. The apparatus of claim 17 in which said record is a photographic record.

21. The apparatus of claim 17 in which said record is a thermo-chromic record.

22. The apparatus of claim 17 in which said record is a xerographic record.

23. Apparatus as in claim 17, in which said spot deflecting means is electrical and including means to adjust the deflecting voltages.

24. Apparatus as in claim 17 in which said spot detection means includes means to determine the deflecting voltages required to project said spot to the detected position on said indicia.

25. Apparatus as in claim 24 including means to reproducibly record said deflecting voltages.

26. Apparatus as in claim 17 in which said energy spot is a luminous spot.

27. Apparatus as in claim 26 in which said spot is deflected by optical means.

28. Apparatus as in claim 26 in which said luminous spot means is a cathode ray oscilloscope.

29. Apparatus as in claim 26 in which said luminous spot means is an optical laser.

30. Apparatus as in claim 29 in which the laser spot is deflected by means of arrays of optical modulators and uniaxial crystals.

31. Apparatus as in claim 17 in which said means to deflect said spot includes a bias voltage source and a control voltage source in each of the two deflection directions.

32. Apparatus as in claim 17 in which said guide indicia include arrays of index areas of distinctive character spaced in precise relation to said matrix, at least in line with each row and column of said matrix.

33. Apparatus as in claim 36 in which said spot detection means includes means responsive to the passage of the energy spot past each of said index areas as the spot is traversed along an indicium.

34. The apparatus of claim 32 in which said indicia comprise at least one pair of intersecting lines of index areas outside of said matrix and parallel to said rows and columns.

35. The apparatus of claim 32 in which said indicia comprise a pair of intersecting lines of index areas with the point of intersection within the body of the matrix.

36. Apparatus as in claim 33 in which said means responsive to the passage of the energy spot comprises means to count the number of index areas past which said spot is traversed.

37. Apparatus as in claim 17 in which said means to project said energy spot onto said guide indicia comprises means to project a first and a second image of said spot constrained so as to follow respectively along a first and a second guide indicium, and said means to deflect said spot comprises means to project a third image of said spot onto said pattern of spots, said three images being precisely related to each other such that when said first and second images reach positions corresponding to a particular row and a particular column respectively, said third image will be on the same row and column.

38. An information storage system comprising, (1) a recording medium sensitive to radiant energy, (2) a spot source of radiant energy, (3) means to project said energy spot onto said recording medium, (4) opaque mask means between said spot and said projecting means, said mask means containing a pattern of translucent areas at all of the points in a matrix of rows and columns, (5) said mask means including also translucent guide indicia precisely placed parallel to the rows and columns of said matrix and including at least index areas opposite each row and column, (6) means for deflecting said spot parallel to the rows and columns of said matrix, (7) said spot source and said mask means so positioned with respect to said recording medium that a spot to be recorded on said medium at a given point in said matrix must pass through the corresponding point in said matrix on said mask means.

39. Apparatus as in claim 38 including means to brighten said energy spot when said image is on the desired row and column.

40. An information system comprising:

(1) information record means comprising:

(a) a record medium, (b) an array of rows and columns defining a two-dimensional matrix of possible positions on said medium, (c) a pattern of spots of recognizable character arranged on the row and column intersections of said matrix, (d) lateral and longitudinal guide indicia parallel respectively to said rows and columns of said matrix, (2) optical laser spot means, (3) means to project said laser spot onto said record, and (4) means to deflect said spot parallel to the rows and columns of said matrix in response to deflection control means.

41. An information system comprising:

(1) information record means comprising:

(a) a record medium, (b) an array of rows and columns defining a two-dimensional matrix of possible positions on said medium, (c) a pattern of spots of recognizable character arranged on the row and column intersections of said matrix, (d) lateral and longitudinal guide indicia parallel respectively to said rows and columns of said matrix, said guide indicia including arrays of index areas of distinctive character spaced in precise relation to said matrix, at least in line with each row and column of said matrix, (2) optical laser spot means, (3) means to project said laser spot onto said record, (4) means to deflect said spot parallel to the rows and columns of said matrix in response to deflection control means, and (5) means to count the passage of the laser spot past each of said index areas as the spot is traversed along an indicium.

References Cited

UNITED STATES PATENTS 3,179,924 4/1965 Auyang et al. __________ 88—1

NORTON ANSHER, *Primary Examiner.*

R. A. WINTERCORN, *Assistant Examiner.*